United States Patent
Deluga et al.

(10) Patent No.: US 7,407,395 B2
(45) Date of Patent: Aug. 5, 2008

(54) LATCH FOR CONNECTING A COMPONENT TO A DEVICE

(75) Inventors: Ronald E. Deluga, Spring, TX (US); Earl Moore, Cypress, TX (US); Jeffrey K. Jeansonne, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/756,351

(22) Filed: May 31, 2007

(65) Prior Publication Data

US 2007/0230141 A1 Oct. 4, 2007

Related U.S. Application Data

(62) Division of application No. 10/939,848, filed on Sep. 13, 2004, now Pat. No. 7,261,574.

(51) Int. Cl.
*H01R 13/62* (2006.01)
(52) U.S. Cl. ................. 439/152; 439/159; 439/923
(58) Field of Classification Search .......... 439/152, 439/159, 157, 923, 928.1, 347; 312/223.2; 361/685

See application file for complete search history.

(56) References Cited

U.S. PATENT DOCUMENTS 6,270,365 B1 * 8/2001 Nishioka .............. 439/159

FOREIGN PATENT DOCUMENTS

| JP | 2003007397 A | 1/2003 |
| JP | 2003099726 A | 4/2003 |

OTHER PUBLICATIONS

Office Action Jan. 29, 2008. Jap. Pat. App. 2005/260740 filed Sep. 8, 2005.

* cited by examiner

*Primary Examiner*—Tho D Ta

(57) ABSTRACT

One embodiment is a system for holding a component in a device comprising: a latch feature that is connected to one of the component and the device and has a tang and a cavity; a latch module that is connected to the other of the device and the component and has a first pin that interacts with the tang and a second pin that moves between a first position and a second position, wherein the first position is within the latch module, and the second position is within the cavity; and wherein the first pin and the second pin are connected with each other such that a movement of the first pin causes the second pin to change from one of the first position and the second position to the other of the first position and the second position.

20 Claims, 3 Drawing Sheets

LATCH FOR CONNECTING A COMPONENT TO A DEVICE

CROSS-REFERENCE TO RELATED APPLICATIONS

This is a divisional of application Ser. No. 10/939,848, filed Sep. 13, 2004 now U.S. Pat. No. 7,261,574, which is hereby incorporated by reference herein.

FIELD OF THE INVENTION

This application relates in general to latches, and in specific to a latch for a removable component.

DESCRIPTION OF THE RELATED ART

Some computer systems have components or modules that may be removed so that other modules may be plugged into the computer systems. This is typical for laptop computers or other mobile computers (e.g. a personal data assistant or PDA), but also servers and desktop computers may have removable components. These smaller, portable computers may have one or more bays that allow a user to plug in one or more components, such as hard drives, optical drives, floppy drives, power supplies, etc., as desired by the user.

Typically, a latch is used to hold the component in the bay and ensure the component remains in electrical connection with the computer system. The latch also may assist in ejecting the component from the bay when the user desires to remove the component from the computer system. Prior latches are varied and wide ranging.

Latches have included simple spring-loaded latches in the system. These require the user to turn the system over, rotate the latch and then manually pull out the device. The advantage to this latch is that it is inexpensive and takes very little space, needing only a small latch and spring. One disadvantage to this latch is that the computer system must be turned upside down. If the laptop is docked, then the computer also needs to be shut down for undocking. Another disadvantage to this solution is that the component must be customized to add a set of holes for a pull tab. This customization then adds supply chain costs because the component vendors must hold a stock of specialized components.

Other latches require levers, handles, cams, springs, and other mechanical parts to provide mechanical advantage to push the component out of the bay of the system. The advantage to this type of system is that the component is firmly held within the system, and the component is relatively easy to remove from the system. A disadvantage is that it is much more complicated because of all the mechanical parts. This complication adds additional cost, significant space, and causes additional failures in the field due to the complexity. It is also difficult to get a consistent feel because each system must implement the levers, cams, and springs in the space that they have available, so they are different from system to system. A consumer that is accustomed to one system may have difficulty with another system.

SUMMARY OF THE INVENTION

One embodiment is a system for holding a component in a device comprising: a latch feature that is connected to one of the component and the device and has a tang and a cavity; a latch module that is connected to the other of the device and the component and has a first pin that interacts with the tang and a second pin that moves between a first position and a second position, wherein the first position is within the latch module, and the second position is within the cavity; and wherein the first pin and the second pin are connected with each other such that a movement of the first pin causes the second pin to change from one of the first position and the second position to the other of the first position and the second position.

DETAILED DESCRIPTION

Figure 1A:
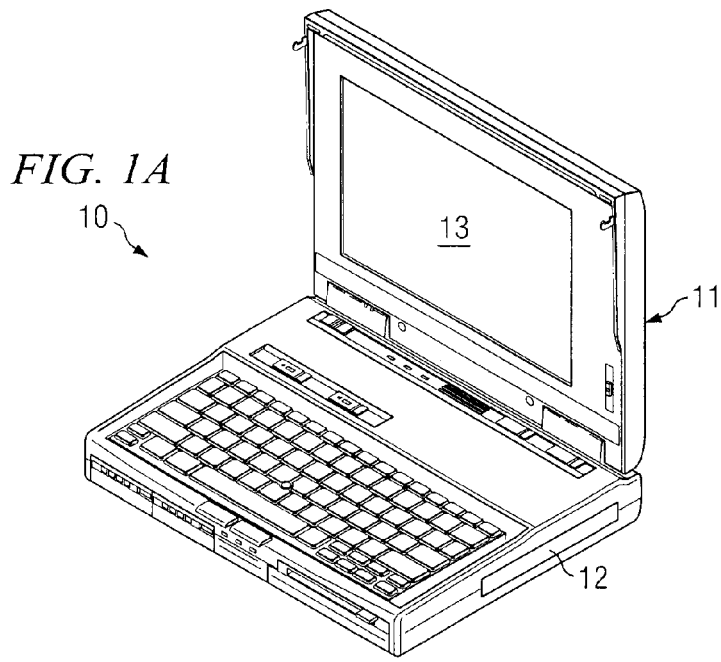
FIGS. 1A and 1B depict views of a computer system having a component that includes a latch involving embodiments.

FIG. 1A depicts a perspective view 10 of a computer system 11 having a component 12 that is latched to the computer system 11 according to embodiments. Component 12 may be a hard drive, an optical drive (e.g. a CD drive or a DVD drive), a floppy drive (e.g. a 3.5 inch drive, a ZIP drive), a modem card, a network card, a memory card (e.g. a memory stick), or a power supply (e.g. a battery or a power converter for connecting with an external power source), as examples.

Note that the location of the component 12 is by way of example only, as the component may be mounted in the front, back, top, bottom, or any of the sides of the computer system, as well as in the display 13 of the computer system. Note that the number of components is by way of example only as the computer system may have more components that may be located in the same location as the component 12, or in a different location of the computer system, e.g. on the opposite side or the back side of the computer system 11. Further, note that the computer system 10 is a laptop computer system; however, other computer systems could be used with embodiments, e.g. a desktop system, a server, a storage system, a network system, a notebook computer, or a personal data assistant. Still further, note other embodiments may involve systems other than computer systems, e.g. game consoles, a television (e.g. a LCD television), or a media player (e.g. a radio, a MP3 player, a tape player, a CD player, or a DVD player). Embodiments would operate with any type of system that would have removable components.

Figure 1B:
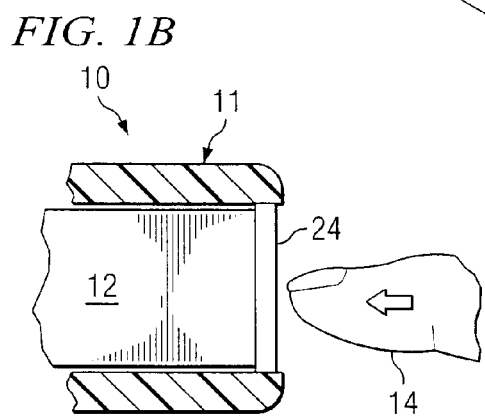

FIG. 1B depicts a sectional view of the computer system 11 depicting a finger 14 of a user that is either inserting or removing the component 12. To insert the component, the user would place the component into a bay or garage of the computer system. The user would then push the bezel 24 (or face plate) of the component, and move the component into the bay, until the latch (described below) holds the component in the bay, and the component electrically connects with the computer system. To remove the component, the user would push the bezel 24 to move the component further into the bay, which unlatches the component, and causes an ejector to push the component out of the bay. The ejector would at least move the component far enough out of the bay to allow the user to grasp and pull the component out of the remainder of the bay.

Figure 2:
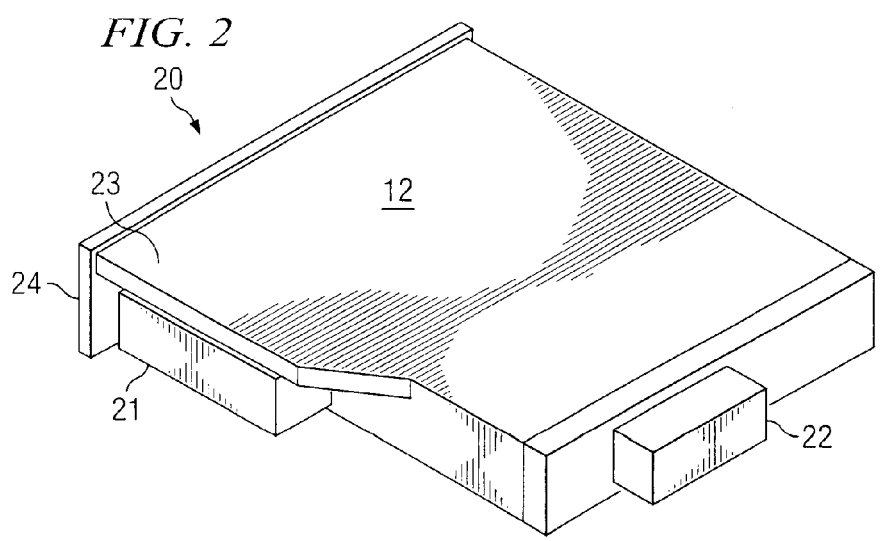
FIG. 2 depicts a perspective view of a component according to a representative embodiment.

FIG. 2 depicts a perspective view 20 of a component 12 according to a representative embodiment. The component 12 typically includes a connector 22 that engages with a corresponding connector of the computer system 11 to provide power to the component (or from the component if the component is a power supply), and data to or from the component as needed for the operation of the component. The component typically includes a flyover portion 23 which may be present on each type of component but is typically used by optical drive components (e.g. CD or DVD drives) to provide extra space or for the optical discs (e.g. a CD disc or DVD disc). The view of FIG. 2 depicts the component 12 engaged with latch module 21. The latch module 21 is attached to the computer system 11 in the bay, and latch module 21 engages with a latch feature (31 of FIG. 3) of the component 12 to hold the component in the bay.

Figure 3:
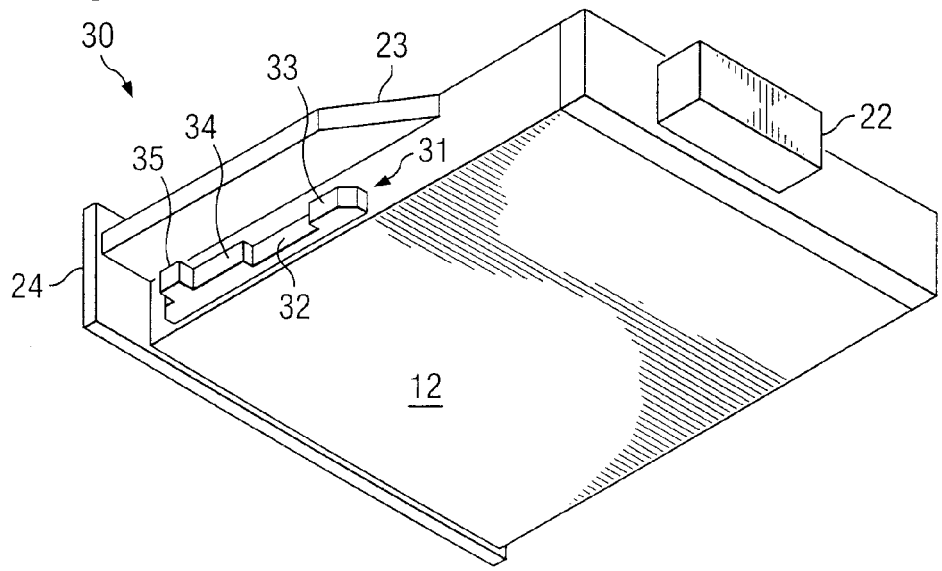
FIG. 3 depicts another perspective view of a component having a latch feature according to the representative embodiment.

FIG. 3 depicts another perspective view 30 of a component 12 having a latch feature 31 according to a representative embodiment. In this view, the component 12 is not engaged with the latch module 21 and the latch feature 31 is depicted. The latch feature 31 comprises a first flange 33 and a second flange 34 that define retention cavity 32. The cavity 32 interacts with a retention pin (41 of FIG. 4) of latch module 21. The second flange 34 includes a tang 35 that interacts with an eject pin (42 of FIG. 4) of the latch module 21. The latch feature 31 may be integrally mounted on the component 12, or it may be connected to the component via a fastener(s), e.g. a screw, a rivet, an adhesive, etc.

Figure 4:
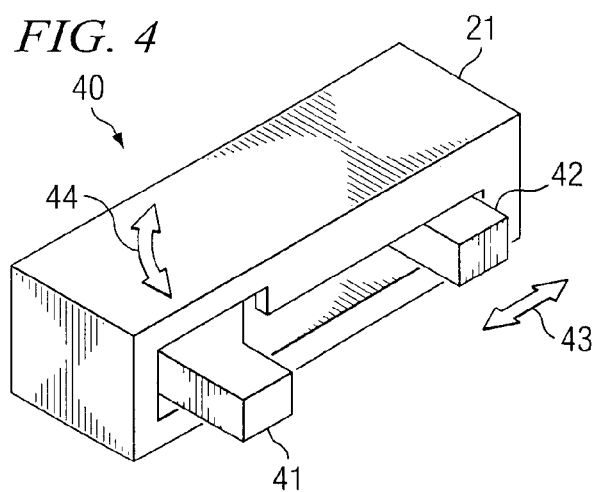
FIG. 4 depicts a perspective view of a latch module according to the representative embodiment.

FIG. 4 depicts a perspective view 40 of a latch module 21 according to a representative embodiment. The latch module 21 includes a retention pin 41, which is spring-loaded, and moves in an arc 44. The retention pin 41 interacts with the cavity 32 of latch feature (31 of FIG. 3). The latch module 21 includes eject pin 42, which is spring-loaded and moves in a direction 43 that is parallel with the direction of movement of component 12 during insertion/removal of component 12 into computer 11. The retention pin 41 is operably connected with the eject pin 42 via at least one spring and at least one bar. The latch module 21 is mounted inside of the computer 11. The latch module 21 may be permanently mounted (e.g. via an adhesive or a rivet(s)) or removably mounted to computer 11 (e.g. via a screw(s)). The latch module 21 may be relatively small, e.g. 4.8 millimeters (mm)×26.8 mm ×50.0 mm. Note that these dimensions are by way of example only as other dimensions could be used.

Figure 5:
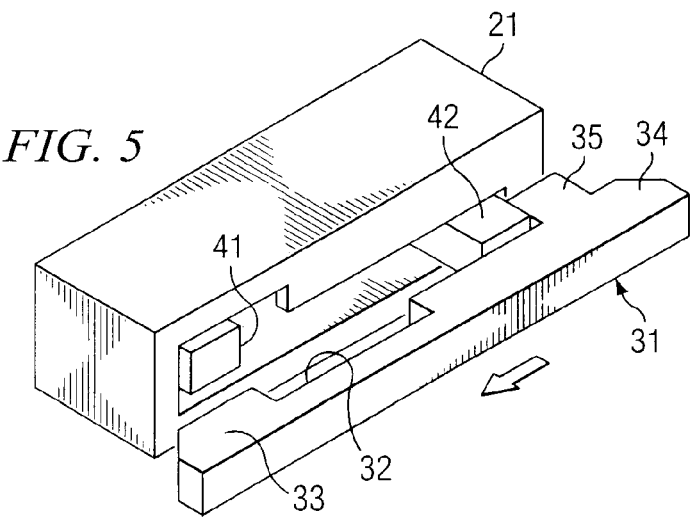
FIGS. 5, 6, and 7 depict a series of views showing the interaction of the latch module with the latch feature during insertion of the component into the computer system, according to the representative embodiment.
Figure 6:
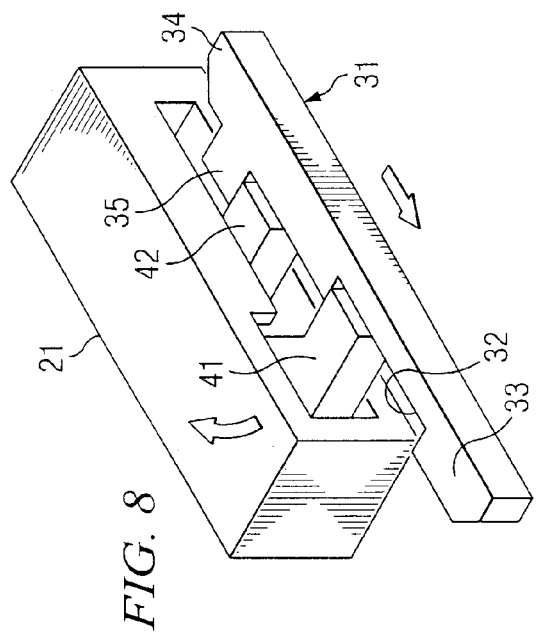
Figure 7:
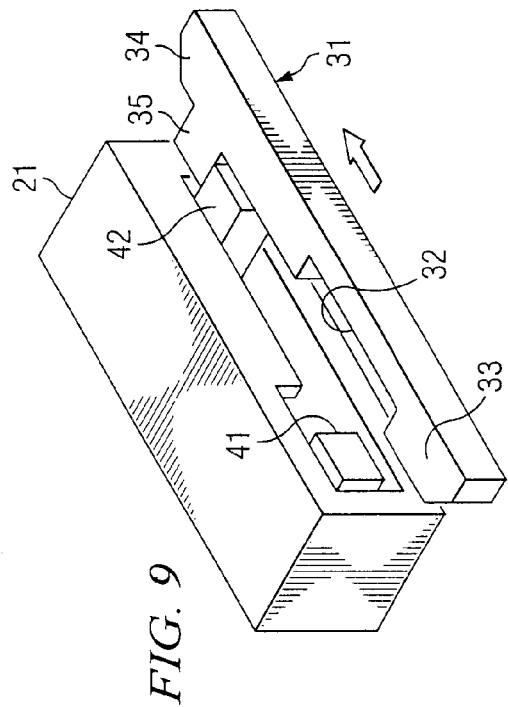

FIGS. 5, 6, and 7 depict a series of views showing the interaction of the latch module 21 with the latch 31 during insertion of the component 12 into the computer system 11, according to this representation embodiment. Note that in FIGS. 5, 6, and 7, the component 12 and the computer system 11 are not shown for simplicity.

In FIG. 5, the component 12 has been inserted into the bay of the computer 11 to where the tang 35 engages with the eject pin 42. The component 12 would be protruding about 3 mm from the side of the computer 11. Note that retention pin 41 is in its retracted position within the latch module 21. The component 12 would then be pushed further into the bay to a location that is about 3 mm past its home location, as shown in FIG. 6. The home location is the position where the bezel 24 of the component 12 is flush with the side of the computer system 11. Of course, in other embodiments the home location may be any desired position at which component 12 is to reside when fully connected to computer system 11. Thus, in FIG. 6 the bezel is about 3 mm inside of the computer bay. The movement of the eject pin 42 to the position of FIG. 6 by tang 35 causes the retention pin 41 to move to its extended position, where the retention pin 41 engages with the cavity 32. After moving to the position of FIG. 6, the user would stop pushing on bezel 24, and the force of the spring on eject pin 42 would move the component to its home position of FIG. 7. In FIG. 7, the retention pin 41 is located within cavity 32 and is in firm contact with flange 33 of latch feature 31. This prevents the movement of the component out of the bay. The force of the spring of the eject pin 42 prevents movement into the bay (unless the component is being pushed inward by an external force). The sides of the bay prevent lateral movement of the component. Note that the 3 mm dimensions are by way of example only as other dimensions could be used.

Figure 8:
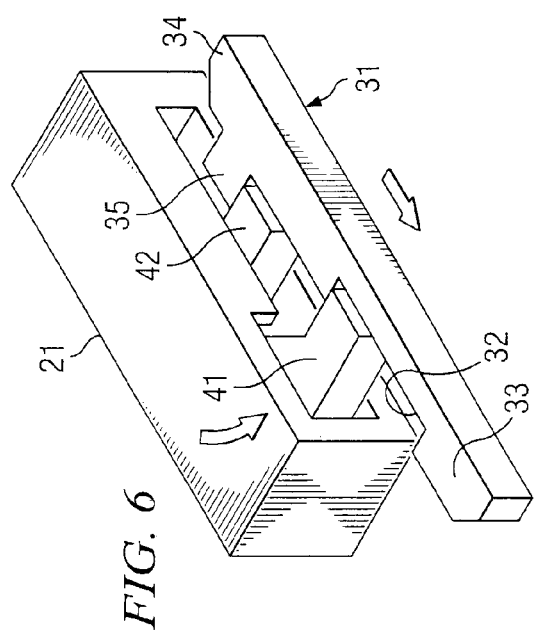
FIGS. 8 and 9 depict a series of views showing the interaction of the latch module with the latch feature during removal of the component from the computer system, according to the representative embodiment.
Figure 9:
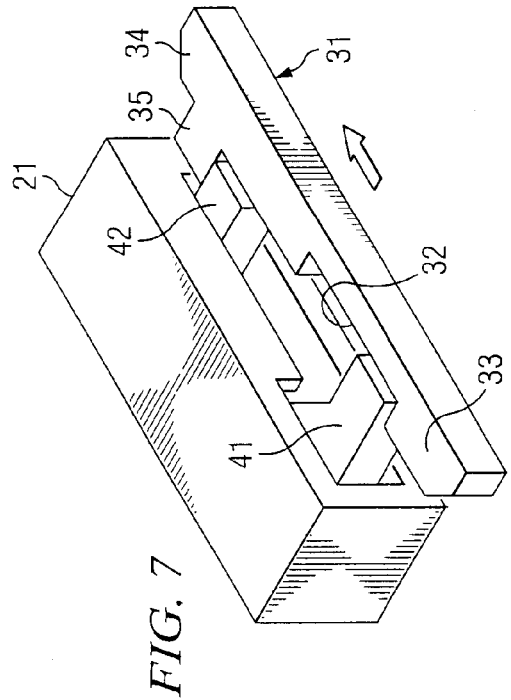

FIGS. 8 and 9 depict a series of views showing the interaction of the latch module 21 with the latch 31 during removal of the component from the computer system, according to this representative embodiment. Note that in FIGS. 8 and 9, the component 12 and the computer system 11 are not shown for simplicity.

From the home position shown in FIG. 7, the component is pushed in to a location that is about 3 mm past its home location, as shown in FIG. 8. As with FIG. 6, the bezel is about 3 mm inside of the computer bay in FIG. 8. The movement of the eject pin 42 to the position of FIG. 8 by tang 35 will cause the retention pin 41 to move to its retracted position, where the retention pin 41 is located with latch module 21. After moving to the position of FIG. 8, the user would stop pushing on bezel 24, and the force from the spring of eject pin 42 would move the component out of the bay about 6-20 mm, which would allow the user to grasp the component and remove it from the computer. FIG. 9 depicts retention pin 41 in the retracted position and the eject pin 42 beginning to move the component out of the bay via tang 35. Note that the 6-20 mm dimensions are by way of example only as other dimensions could be used.

The operations used to both install and remove components involve pushing, i.e. the component 12 is pushed into the computer 11 to latch the component, and the component is again pushed into the computer to unlatch and remove the component. Thus, the latch module 21 and the latch feature 31 can be referred to as a push-push mechanism, and a component 12 that uses the latch module 21 and the latch feature 31 can be referred to as a push-push component or device.

Embodiments of the latches described herein may be used in different computer systems, thus providing the user with a constant feel for inserting/removing components for the different computer systems. Embodiments of the latches described herein enable the insertion/removal of a component without having to undock a mobile computer or without having to turn a computer upside down. Embodiments provide a latch that is easy for a user to operate, by providing the user with a large area to push (e.g. the bezel of the component).

Note that the FIGURES depict the latch module 12 being attached to the computer system 11 and the latch feature 31 being attached to the component 12; however, other embodiments would have the latch module 21 being attached to the component 12 and the latch feature 21 being attached to the computer system 11. As the latch feature 21 has no moving parts, this may be mounted (e.g. permanently) within the computer system 11. The latch module 31, which has moving parts, may be connected to the removable component 12, and thus may be more readily repaired or replaced.

What is claimed is:

1. A method, comprising:
moving a first pin of a device via contact with a tang of a component inserted into the device;
moving a second pin of the device from a retracted position to a position that is within a cavity of the component by movement of the first pin of the device that changes the proximity of the first pin to second pin; and
engaging the second pin with a side of the cavity, thereby preventing the component from moving out of the device.

2. The method of claim 1, further comprising moving the second pin into the cavity as the distance between the first pin and the second pin decreases.

3. The method of claim 1, further comprising applying force to a faceplate of the component to move the component into the device until the faceplate of the component is within a housing of the device.

4. The method of claim 1, further comprising discontinuing application of force to a faceplate of the component to allow the component to move to an operational position.

5. The method of claim 4, further comprising moving the component from a location where the faceplate is within the device housing to an operational position where the faceplate is flush with a device housing.

6. The method of claim 4, further comprising moving the component to an operational position via pressure of the first pin against the tang.

7. The method of claim 1, further comprising initiating extraction of the component from the device by applying force to the component to move the component from an operational location to a location further within the device.

8. The method of claim 7, further comprising moving the second pin from the cavity of the component to a retracted position within the device as the proximity of the first pin to the second pin changes.

9. The method of claim 7, further comprising moving the second pin from the cavity of the component to a retracted position within the device as the distance between the first pin and the second pin decreases.

10. The method of claim 7, further comprising:
discontinuing the application of force to push the component into the unit; and
ejecting, at least in part, the component from the device by force applied to the tang via the first pin.

11. A method, comprising:
moving a first pin of a component via contact with a tang of a device into which the component is inserted;
moving a second pin of the component from a retracted position to a position that is within a cavity of the device by movement of the first pin of the component that changes the proximity of the first pin to second pin; and
engaging the second pin with a side of the cavity, thereby preventing the component from moving out of the device.

12. The method of claim 11, further comprising moving the second pin into the cavity as the distance between the first pin and the second pin decreases.

13. The method of claim 11, further comprising applying force to a faceplate of the component to move the component into the device until the faceplate of the component is within a housing of the device.

14. The method of claim 13, further comprising discontinuing application of force to the faceplate of the component to allow the component to move to an operational position.

15. The method of claim 14, further comprising moving the component from a location where the faceplate is within the device housing to an operational position where the faceplate is flush with a device housing.

16. The method of claim 14, further comprising moving the component to an operational position via pressure of the tang against the first pin.

17. The method of claim 11, further comprising initiating extraction of the component from the device by applying force to the component to move the component from an operational location to a location further within the device.

18. The method of claim 17, further comprising moving the second pin from the cavity of the device to a retracted position within the component as the proximity of the first pin to the second pin changes.

19. The method of claim 17, further comprising moving the second pin from the cavity of the device to a retracted position within the component as the distance between the first pin and the second pin decreases.

20. The method of claim 17, further comprising:
discontinuing the application of force to push the component into the unit; and
ejecting, at least in part, the component from the device by force applied to the tang via the first pin.

* * * * *